United States Patent Office

2,747,963
Patented May 29, 1956

2,747,963

METHOD OF PROCESSING FLUORSPAR

Alfred M. Thomsen, San Francisco, Calif.

No Drawing. Application March 23, 1955,
Serial No. 496,349

4 Claims. (Cl. 23—66)

Fluorspar, fluorite, calcium fluoride, is a rather common mineral but in large bodies of high purity it is anything but common. Many of the larger known bodies are nearing exhaustion and many have already passed into oblivion. As of today most high grade fluorspar is obtained by milling of low grade material and the flotation method employed lacks much to be desired. In addition, a great many of the rarer metals are often associated with fluorspar and such are lost in milling practice. A chemical approach to the use of such material, especially when rare metals are associated therewith, is, therefore, a rather vital problem in the future of the fluorine industry.

My process is best understood by considering a definite type of ore and then describing just how I handle it. Assuming the following composition: Fluorite 50%, calcite 30%, heavy spar 11%, silica 2%, iron oxide 2%, gypsum 3%, not otherwise specified 2%; such an ore would be commingled with ammonium sulphate in the following ratio: Ore, 1 ton, ammonium sulphate, 1¼ ton. The ore must be finely ground, at least 100 mesh, and the mix is best made wet to minimize dust losses. The resultant slurry is run into the cool end of a rotary kiln. The hot end of the kiln is kept at between 800° and 900° F. and the feed is so regulated that the calcines issue substantially ammonia-free.

Said calcines consist essentially of calcium sulphate commingled with such iron sulphate as has been formed, and the inert ingredient, barium sulphate. The fluorine of the ore has been volatilized as hydrofluoric acid and the silica as silicofluoride. The ammonia, evolved as $NH_3$ in the heating step, combines with such fluorine combinations forming the volatile ammonium fluoride and silicofluoride. Assuming the kiln to be heated with a carbon containing fuel, the rest of the ammonia will combine with carbon dioxide.

The gases from the kiln are passed through two scrubbers in series, the first yielding a solution of the fluorine compounds, the second ammonium carbonate. Adequate cooling to dissipate the heat of the gases is, of course, essential. If the end product is to be an "acid grade" artificial fluor spar it will only be necessary to commingle the fluoride solution with the theoretical amount of burnt lime and heat. Ammonia will be evolved and a slurry of calcium fluoride, containing a little silico-fluoride, will be obtained. Filtering and drying will be self evident. The ammonia evolved will likewise be carbonated and will then be re-cycled in the following manner:

The calcines are first leached with water to remove water soluble sulphates, such as iron and the rare earths, and even rarer metals involved, calcium sulphate being relatively insoluble. After such leaching the residual calcium sulphate is commingled with the carbonated ammonia previously referred to. Calcium carbonate is formed and the ammonium sulphate solution reconstituted for re-cycling to fresh fluorspar. In this manner only a very small amount of ammonium sulphate will be required to make up for unavoidable losses, the operation being otherwise self-contained. Instead of this approach, caustic soda may be substituted for lime and sodium fluoride will be the marketable product, or caustic potash may be used.

That any metals of the rare earths, or other rare metals, which often are associated with fluorspar will be found in the leach waters from the water extraction of the calcines is obvious if said metals possess water soluble sulphates. To illustrate: If vanadium were present then vanadium sulphate would be found concentrated in said leach water. While it may well be that the economic value of such rarer material would exceed that of the fluorine, its separation as herein indicated will be an inevitable result of the working of my process and further processing of such material, while conventional enough, is deemed to be beyond the scope of this disclosure.

Parenthetically it may be mentioned that if the ammonium or alkali metal fluorides be the end product then simple crystallizing technique will separate silicofluoride from fluoride, at least down to the accepted market grades which in case of sodium fluoride is from 1% to 3% of silicofluoride. It is obvious that if ammonium fluoride be marketed then additional ammonia as $NH_3$ or as sulphate will be required to make up the deficit thus occasioned. All other details appear self-evident.

Having thus fully described my process, I claim:

1. The method of processing fluorspar which comprises; commingling the ground ore with ammonium sulphate and heating until all ammonia has been volatilized; leaching the resultant calcines with water to remove metallic sulphates relatively more soluble than calcium sulphate; commingling the resultant leached calcium sulphate residual with ammonium carbonate to form calcium carbonate and a solution of ammonium sulphate; separating said calcium carbonate and re-cycling said ammonium sulphate to fresh fluorspar containing ore.

2. The method of processing fluorspar set forth in claim 1, with the added step that the gases evolved in heating be progressively absorbed in water thus yielding solutions of ammonium fluoride and ammonium carbonate, respectively.

3. The method of processing fluorspar set forth in claim 2, with the added step that the solution of ammonium fluoride obtained therein be commingled with sufficient alkali metal hydroxide to liberate the resident ammonia, removing said ammonia, carbonating same and commingling it with the calcium sulphate produced elsewhere in the process to produce calcium carbonate and ammonium sulphate for the prescribed re-cycling.

4. The method of processing fluorspar set forth in claim 2, with the added step that the solution of ammonium fluoride obtained therein be commingled with a sufficient amount of an alkaline hydroxide, selected from the group consisting of the hydroxides of potassium, sodium and calcium, to liberate the resident ammonia; removing said ammonia; carbonating the ammonia thus obtained and commingling it with the calcium sulphate produced elsewhere in the process to produce calcium carbonate and ammonium sulphate; separating said calcium carbonate from said ammonium sulphate and recycling the latter to fresh fluorspar.

References Cited in the file of this patent

UNITED STATES PATENTS

| | | |
|---|---|---|
| 1,957,244 | Borradaile | May 1, 1934 |
| 2,640,757 | Robinson | June 2, 1953 |

OTHER REFERENCES

J. W. Mellor's "A Comprehensive Treatise on Inorganic and Theoretical Chemistry," vol. 3, 1923 Ed., page 694; Longmans, Green and Co., New York.